United States Patent [19]

Ravid

[11] Patent Number: 5,058,004
[45] Date of Patent: Oct. 15, 1991

[54] COMPUTER GATE CONTROL CIRCUITRY AND APPARATUS TO ENABLE A SINGLE COMPUTER TO SIMULTANEOUSLY AND SELECTIVELY CONTROL A MULTIPLICITY OF HARD DISK DRIVES

[76] Inventor: Gonen Ravid, 29034 Acanthus Ct., Agoura Hills, Calif. 91301

[21] Appl. No.: 599,755

[22] Filed: Jan. 19, 1990

[51] Int. Cl.$^5$ .............................................. G06F 3/00
[52] U.S. Cl. ................................. 364/200; 364/231.5; 364/236.2; 364/236.3; 364/238.3; 364/238.4; 364/245.0; 364/245.6; 364/260.1; 364/245
[58] Field of Search ................................. 364/200, 900

[56] References Cited

U.S. PATENT DOCUMENTS

| | | | |
|---|---|---|---|
| 4,583,194 | 4/1986 | Cage | 364/900 |
| 4,593,375 | 6/1986 | Gershenson | 364/900 |
| 4,612,613 | 9/1986 | Gershenson et al. | 364/200 |
| 4,742,448 | 5/1988 | Sander et al. | 364/200 |
| 4,805,090 | 2/1989 | Coogan | 364/200 |
| 4,937,783 | 6/1990 | Lee | 364/900 |

Primary Examiner—Allen R. MacDonald
Assistant Examiner—Robert S. Hauser
Attorney, Agent, or Firm—Thomas I. Rozsa

[57] ABSTRACT

A gate control circuitry and apparatus to enable a single computer to simultaneously and selectively control a multiplicity of hard disk drives or other computer component devices.

12 Claims, 3 Drawing Sheets

COMPUTER GATE CONTROL CIRCUITRY AND APPARATUS TO ENABLE A SINGLE COMPUTER TO SIMULTANEOUSLY AND SELECTIVELY CONTROL A MULTIPLICITY OF HARD DISK DRIVES

BACKGROUND OF THE INVENTION

The present invention relates to computer technologies. In particular, the present invention relates to computer gate control circuitry and apparatus.

Figure 1:
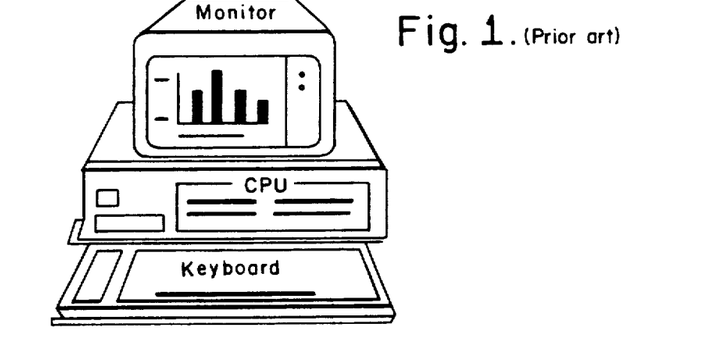
FIG. 1 is a schematic diagram of a typical single personal computer.
Figure 2:
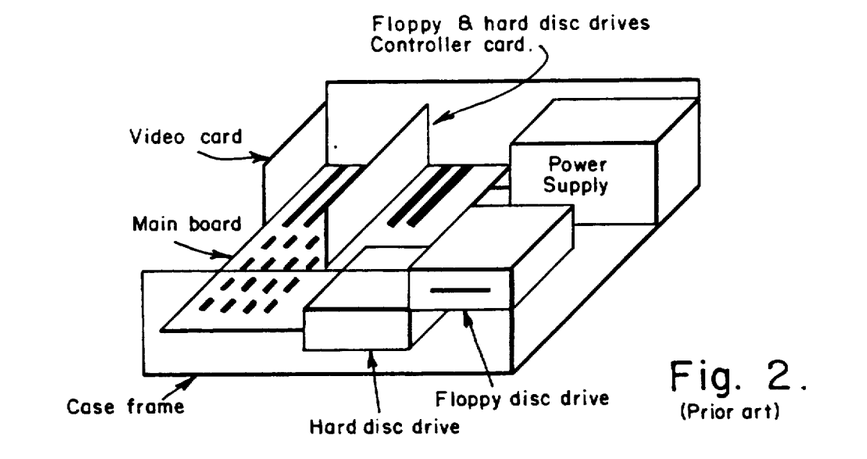
FIG. 2 is a schematic diagram of the inside view of the central processing unit (CPU) of a personal computer.

Today a typical personal computer like an IBM PC/AT comprises three major devices: an input unit, a central processing unit (CPU) and an output unit. An input unit is often a keyboard, an output unit is often a monitor, where both are connected to the CPU as shown in FIG. 1. Inside the CPU, referring to FIG. 2, there are several major parts: a main board, a power supply, a floppy disk drive, a hard disk drive, where all are mounted on a case frame, a floppy and hard disk drive controller card vertically inserted onto one of the input/output (I/O) slots on the main board and also mounted on the case frame, and a video card inserted onto another I/O slots and mounted on the case frame. The power supply is connected to the main board and the disk drives through power cables. The controller is connected to the disk drives through controller cables. The keyboard is connected to the main board through a keyboard cable, and the monitor is connected to the video board through a monitor cable.

The floppy and hard disk controller card is inserted onto one of the I/O slots on the main board, so it is one kind of the so called I/O cards. Other examples of I/O cards are the video card which is used for the monitor, & serial port card which is often used for a mouse (a pointing device) or a modem (a communication device), parallel port card which is often used for a printer or a plotter, and so on. A computer has a certain I/O address map to send signals to different I/O cards, and these addresses are usually represented in hexadecimal (HEX) codes. For example, in an IBM PC/AT personal computer the I/O address (in HEX code) for the floppy disk drive controller is 3F8-3FF, for the hard disk drive controller is 1F0-1F8, for the monochrome video card is 3B0-3BF and for the color video card is 3D0-3DF. Usually two identical I/O cards with identical I/O addresses can not be used together on one computer because they may conflict with each other.

In the computer manufacture and service industry there is often a need to use a single computer to control a multiplicity of hard disk drives for efficient and effective operations such as preparation, diagnosis or data storage. The controller on today's market for a personal computer usually can only control up to two hard disk drives where one of them is set as drive 1 and the other drive 2. It is also built with two I/O addresses: a primary address and a secondary address. Sometimes two identical controllers can be put into one computer so it can control up to four identical hard disk drives with two of them as number 1 and the other two as number 2. However in order to do so one of the controllers has to be set at the primary address and the other the secondary. But on some controllers, the secondary address is not always available. Thus there is still only one controller that can be always used in one computer and there are still only two hard disk drives that can be always controlled by one computer.

Furthermore, out of these two hard disk drives usually only one can be the hard disk drive to be operated for preparation, diagnosis or data storage as a "target drive". Also when a second hard disk drive is connected to the same controller, it has to be physically set via a jumper as drive 2, and after the preparation set back as drive 1. The reason is that the above operations are often performed by executing the software programs loaded on a hard disk drive so one of the two hard disk drives controlled by a controller has to be used to serve as a "source drive" for that purpose and must not be disturbed. Alternatively a floppy disk drive can be used as the "source drive" but it creates slow and cumbersome operation where a few floppy diskettes have to be used to preparing the "target" hard disk drive. Therefore when a single computer with a source drive is used, there is only one more "target drive" that can be added. So using a single computer for operations such as preparation, diagnosis or data storage on hard disk drives is so far still a one-on-one operation.

One suggestion of using a single computer to control a multiplicity of hard disk drives is to build a special computer which can assign multiple different addresses to a multiplicity of identical controllers, and each of these identical controllers is built with a circuit which can decode the different addresses. But the cost of building such type of computers and controllers does not justify the benefit and the off the shelf computers and controllers can not be used.

It will be beneficial if there is a gate control circuitry and apparatus which can be used, together with a single computer, so the computer can simultaneously and selectively send signals to a multiplicity of identical controllers and through them control a multiplicity of identical hard disk drives.

SUMMARY OF THE PRESENT INVENTION

The present invention is a gate control circuitry and apparatus to enable a single computer to simultaneously and selectively control a multiplicity of hard disk drives.

It is known that from the central processing unit (CPU) of a computer there are three groups of signals being sent out through the I/O slots on the main board: data signals, address signals and control signals. There are sixteen (16) data lines carrying the data signals to a I/O device such as a disk drive controller. There are twenty (20) address line carrying the address signals which activate different I/O devices with the corresponding address. And there are several control lines carrying control signals to control the functioning of the I/O device. Some of the I/O addresses are the primary hard disk drive address. Other I/O addresses are used for the secondary hard disk drive controller.

It has therefore been discovered, according to present invention, that if a multiplicity of gates is connected to the data lines from the CPU through a latch which is connected with the control lines from the CPU through an address decoder, then the individual status of each gate, whether it is open or closed, can be controlled by the CPU through the data bus. Each one of the gates can be either open or closed to pass or block the signal carried by the signal line connected with the gate, and more than one gate can be open simultaneously.

It has further been discovered, according to present invention, that if the hard disk drive address lines are branched off, through each of the gates, into each one of a multiplicity of identical controllers which are connected to the gates one-by-one respectively, and all the data lines, all the other address lines and all the related control lines are also branched off into these controllers but without being connected through the gates, then the individual performance of each controller can be controlled by the CPU through the signal lines. Since one of the hard disk drive address lines is routed through the gates and the status of the gates is controlled by the CPU, the CPU can simultaneously and selectively control a multiplicity of hard disk drives which are each individually connected with one of the controllers as "target drives" for operations such as preparation, diagnosis or data storage because once a gate is open, the hard disk drive address signal carried by the hard disk drive address line connected with the gate can pass through it so the corresponding controller can be activated and control the respective hard disk drive, and once the gate is closed, the hard disk drive address signal is blocked so the controller can be deactivated.

It has been furthermore discovered, according to present invention, that a single address line determines whether a controller responds to a primary address or a secondary address. If this line is routed through an invertor before it is connected to each of the controllers, then the controllers will respond to signals sent by the CPU to the secondary hard disk drive controller address but be activated only if their address is set up as primary hard disk drive controller. Therefor the CPU can reserve the primary address for the "source drive" in the computer and use the secondary address to activate those identical controllers which control the "target drives", and the controllers can still function as primary controllers to avoid the risk that for some AT intelligent drive (IDE) the secondary address is not always available.

It is therefore an object of the present invention to provide a gate control circuitry and apparatus to enable a single computer to simultaneously and selectively control the status of each individual gate in a multiplicity of gates.

It is a further object of the present invention to provide a gate control circuitry and apparatus to enable a single computer to perform operations such as preparation, diagnosis or data storage on a multiplicity of hard disk drives simultaneously and selectively by controlling the gates which can either permit or block the passage of the hard disk drive address signal.

It is an additional object of the present invention to provide a gate control circuitry and apparatus to enable a single computer with its own "source hard disk drive" operated on the primary address to perform operations on a multiplicity of "target hard disk drives" through the secondary address signals, and the controllers of the "target drives" can respond to the secondary signal but still function as primary controllers.

It is a further object of the present invention to provide a gate control circuitry and apparatus to enable a single computer with its own "source hard disk drive" disabled to perform operations on a multiplicity of "target hard disk drives" through the primary address signals.

It is an even further object of the present invention to provide a gate control circuitry and apparatus to enable a single computer to perform operations on a multiplicity of computer components including floppy disk drives, tape backup drives, CD ROM and even monitor simultaneously and selectively by using the gate circuitry.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principle of the invention. Various changes and modifications obvious to one skilled in the art to which the invention pertains are deemed to be within the spirit, scope and contemplation of the invention as further defined in the appended claims.

Figure 3:
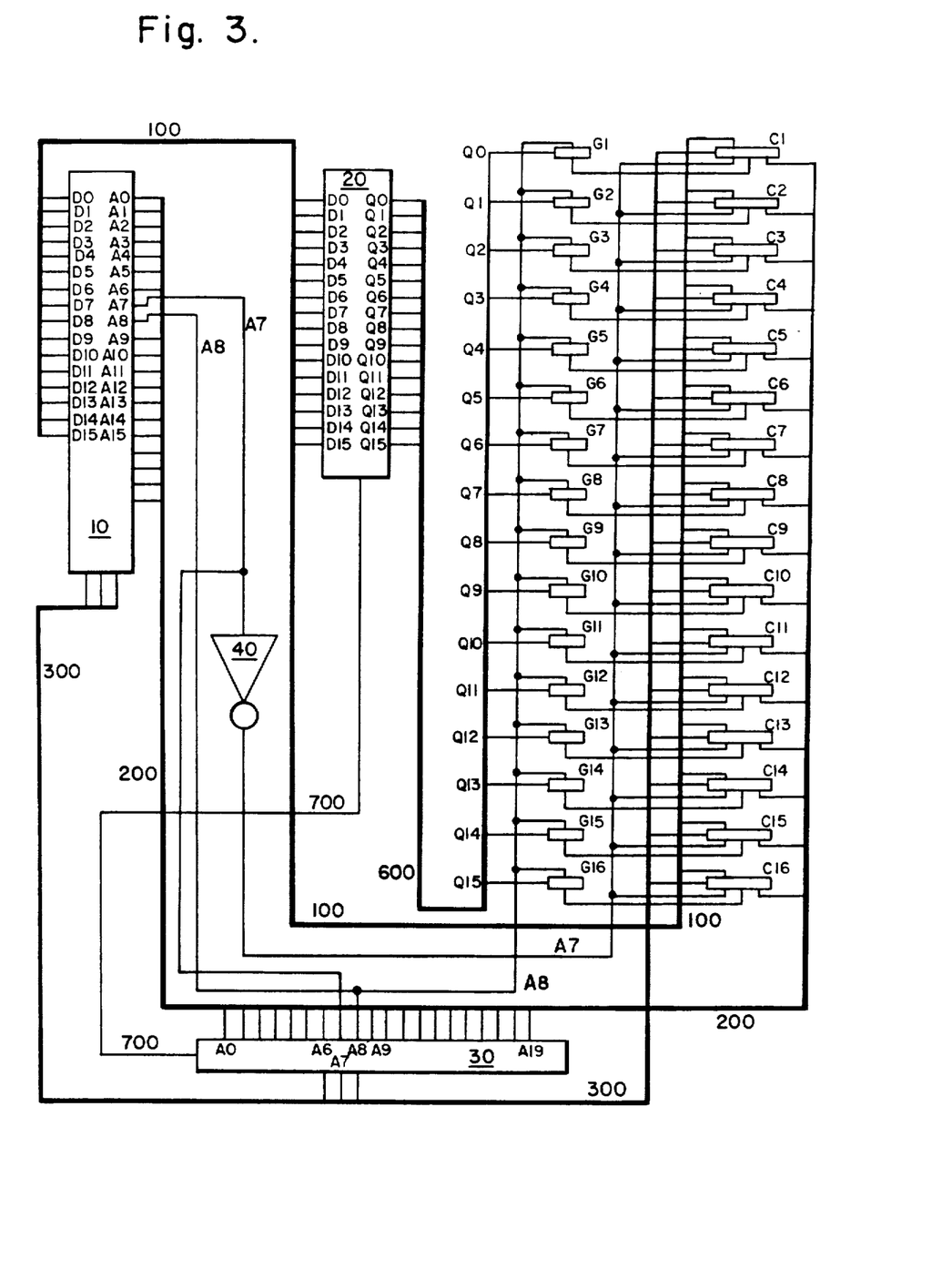
FIG. 3 is a schematic diagram of the circuitry of the present invention.
Figure 4:
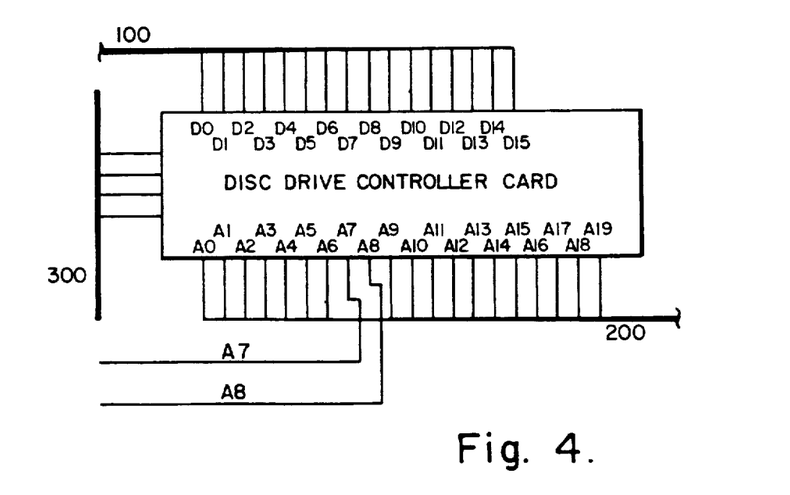
FIG. 4 is a schematic diagram of the detailed circuitry of one of the sixteen disk drive controller cards shown in FIG. 3.

Referring to FIG. 3, there is shown the schematic diagram of the circuitry of the preferred embodiment of the present invention. A I/O port of a CPU of a single computer is designated as 10. There are sixteen data lines carrying data signals from CPU port 10 which are labeled as D0, D1, D2, D3, D4, D5, D6, D7, D8, D9, D10, D11, D12, D13, D14, and D15. All of them are converged on to line 100. Line 100 is branched off to a latch which is designated as 20 and then branched off to each of a multiplicity of sixteen disk drive controllers which are designated as C1, C2, C3, C4, C5,C6, C7, C8, C9, C10, C11, C12, C13, C14, C15, and C16. There are twenty address lines carrying I/O address signals from CPU port 10 which are designated as A0, A1, A2, A3, A4, A5, A6, A7, A8, A9, A10, A11, A12, A13, A14, A15, A16, A17, A18, and A19. All of them except A7 and A8 are converged on to line 200. Line 200 is branched off to a decoder which is designated as 30 and then branched off to each of the sixteen controllers. There are also several control lines carrying control signals from CPU port 10 which are converged on to line 300. Line 300 is branched off to decoder 30 and then branched off to each of the sixteen controllers. FIG. 4 shows how line 100, line 200 and line 300 are branched off to a certain controller. Line 700 connects latch 20 and decoder 30. There are sixteen signal lines carrying latch signals from latch 20 which are designated as Q0, Q1, Q2, Q3, Q4, Q5, Q6, Q7, Q8, Q9, Q10, Q11, Q12, Q13, Q14, and Q15. All of them are converged on to line 600. Line 600 is branched off to each of a multiplicity of sixteen electronic gates which are designated as G1, G2, G3, G4, G5, G6, G7, G8, G9, G10, G11, G12, G13, G14, G15, and G16. Branched off from line 600, line Q0 is connected to gate G1, line Q1 is connected to gate G2, and so on, and line Q15 is connected to gate G16. Each gate is connected to a controller through the address line A8 as shown in FIG. 4. Gate G1 is connected to controller C1, gate G2 is connected to controller C2, and so on, and gate G16 is connected to controller C16. Each controller controls a hard disk drive. Address line A7 is connected to an invertor which is designated as 40; then branched off to each of the sixteen controllers as shown in FIG. 4. Address line A8 is connected to decoder 30 and then branched off to each of the sixteen gates.

Data signals output from CPU port 10 are input to latch 20 all the time. But the output signals from latch 20 remain stationary until decoder 30 send a new decoded control signal to latch 20. For example if the last gate, G16, is to be open, then latch 20 will set the signals at Q0 through Q15 accordingly such that Q15 is "1" and the rest is "0" so gate 16 is open and all others are closed.

All signals output from CPU 10 port are input to the by address lines A7 and A8. Line A8 carries both primary and secondary addresses of hard disk drives. It is branched off to the gates first before being connected to the controllers. Each gate is functioned in a way so that when it is open, it permits the passage of the hard disk drive address signal to the respective controller connected to the gate so the controller is activated and can perform operations on the respective hard disk drive controlled by the controller, and when it is closed, it blocks the passage of the hard disk drive address signal to the respective controller so the controller is deactivated and can not perform operations on the respective hard disk drive.

Address line A7 carries a signal which determines whether a controller responds to a primary address signal or a secondary address signal output from CPU port 10. The computer usually has its own controller which is often identical with the outside controllers connected to the gates. This "system controller" controls the hard disk drive in the computer which is loaded with operation software programs and serves as a "source drive". The computer activates the "system controller" through the primary hard disk drive address. However the other controllers can not be also activated through the primary address because the CPU has to send out signals to them through the secondary address to avoid the conflict with the "system controller". But it is desirable to have the other controllers receive the control signals through their primary address, because for some of the off the shelf controllers or AT intelligent drive (IDE) controllers secondary address is not always available. Therefore in the present invention address line A7 is connected through invertor 40 before it is branched off to these controllers so that they can respond to the secondary address signals sent from CPU port 10 but receive them through their own primary address, thus they function as primary controllers.

Since each of the sixteen gates can be either open or closed, more than one controller can be activated simultaneously. Also it is possible to select certain gates to be open and others to be closed. All these can be done by the CPU through the data, address and control lines and the functions of the latch, the decoder, the gates, and the design of the circuitry. It completely reserves and protects the access to the "source drive" but still make the multiplicity of identical controllers function as primary controllers. If a function performed on a hard disk drive prohibits more than one identical controllers from using the same I/O address, the gate apparatus can block other controller lines and only leave one controller to be active. Actually the gate apparatus can allow one or more controllers to be active, depending on what functions are being performed on the hard disk drives. All of these can be done on a single computer.

The present invention gate control circuitry and apparatus can further have more than one latch. Each latch can be attached by as many as sixteen (16) controllers. If two latches are used then there are thirty-two controllers being controlled simultaneously. Three latches, forty-eight controllers, and so on.

The present invention gate control circuitry and apparatus can also be used for other computer components including floppy disk drives, tape backup drives, CD ROM and even monitors because they are controlled by and communicated with the CPU in the same way as the hard disk drive controllers and hard disk drives which uses data bus, address decoding and latching techniques. The respective controlling address lines can be also rerouted through the gate control circuitry just as what has been done for the hard disk drive controllers.

Figure 5:
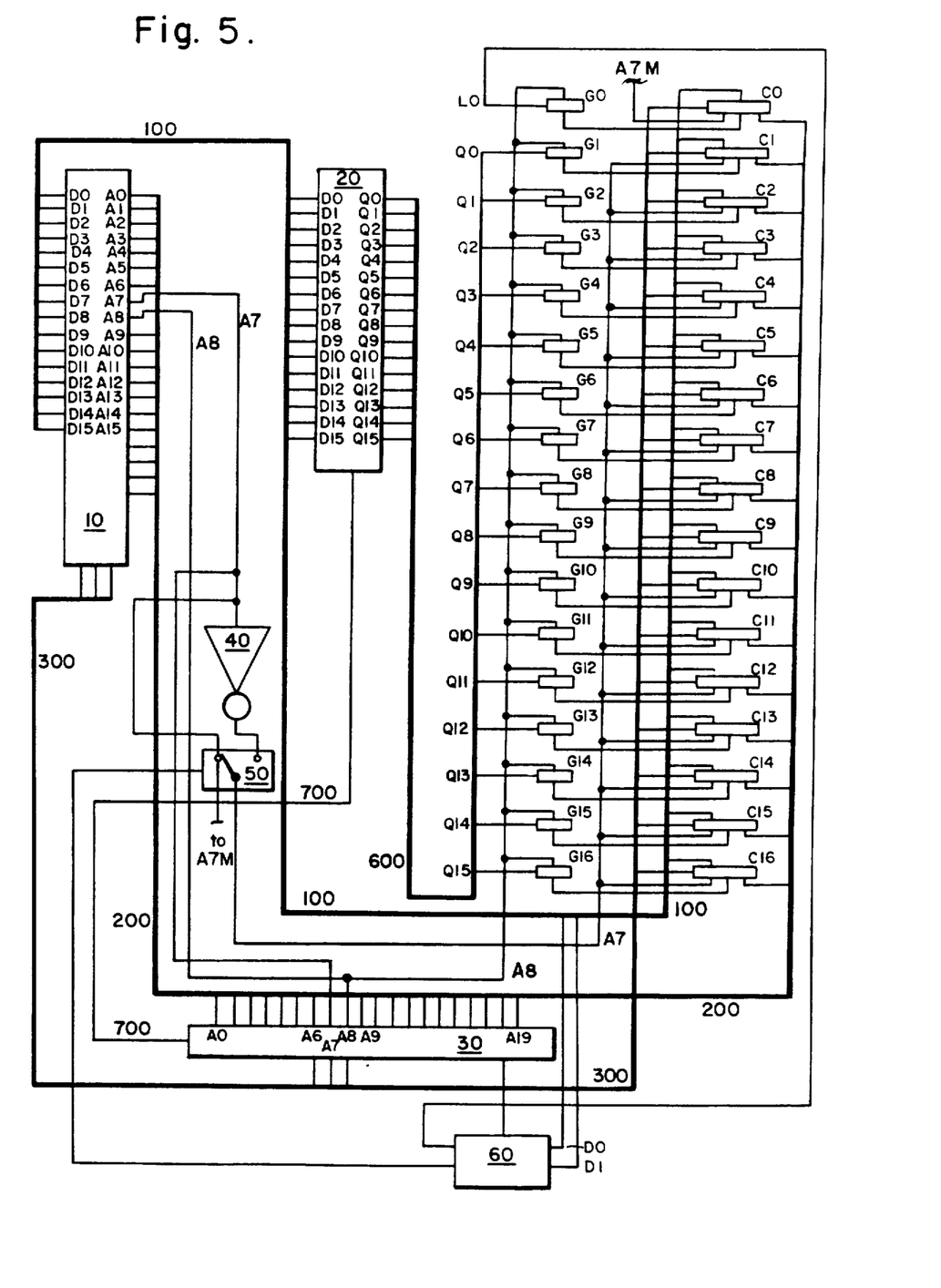
FIG. 5 is a schematic diagram of the circuitry of an alternative embodiment of the present invention.

Referring to FIG. 5, there is shown a different embodiment of the present invention gate control circuitry and apparatus which further comprises an electronic switch means 50 connected to invertor means 40 and system hard disk drive controller means C0, which may be used to let primary and secondary hard disk drive addresses switching line A7 bypass invertor means 40, a system gate means G0 connected to latch 20, decoder 30 and system hard disk controller C0, and an additional latch means 60 connected to electronic switch means 50, system gate means G0, decoder means 30 and the multiplicity of hard disk drive controllers means. When the gate control circuitry and apparatus is connected between the computer and a multiplicity of hard disk drives respectively, and when electronic switch means 50 is switched to let primary and secondary hard disk drive addresses switching line A7 bypass invertor means 40, the gate control circuitry and apparatus can disable system hard disk drive controller means C0 by additional latch 60 through system gate means G0 and enable the computer to simultaneously and selectively control the multiplicity of hard disk drives as primary drives for operations such as diagnosis or verification.

Defined in detail, the present invention is a gate control circuitry and apparatus for a single computer having sixteen (16) data lines, twenty (20) I/O address lines including a hard disk drive address line and a primary and secondary hard disk drive addresses switching line, and several control lines output from the CPU, the gate control circuitry and apparatus comprising: (a) a latch means connected to said sixteen data lines; (b) a multiplicity of gate means connected to said latch means respectively; (c) sixteen disk drive controller means connected to said sixteen gate means respectively; (d) a decoder means connected to said latch means; (e) said hard disk drive address line connected to said decoder means and branched off into said sixteen gate means; (f) an invertor means; (g) said primary and secondary hard disk drive addresses switching line connected to invertor means and branched off into said sixteen controllers means; (h) all other lines of said twenty I/O address lines connected to said decoder means and branched off into said sixteen controllers means; and (i) said several control lines connected to said decoder means and branched off into said sixteen controller means; (j) whereby when said gate control circuitry and apparatus is connected between said computer and sixteen hard disk drives respectively, the gate control circuitry and apparatus can enable the computer to simultaneously and selectively control the sixteen hard disk drives for operations such as preparation, diagnosis or data storage.

Defined broadly, the present invention is a gate control circuitry and apparatus for a single computer having a multiplicity of data lines, a multiplicity of I/O address lines including a hard disk drive address line and a primary and secondary hard disk drive addresses switching line, and several control lines output from the CPU, the gate control circuitry and apparatus comprising: (a) a latch means connected to said multiplicity of data lines; (b) a multiplicity of gate means connected to said latch means respectively; (c) a multiplicity of disk drive controller means connected to said multiplicity of gate means respectively; (d) a decoder means connected to said latch means; (e) said hard disk drive address line connected to said decoder means and branched off into said multiplicity of gate means; (f) an invertor means; (g) said primary and secondary hard disk drive addresses switching line connected to invertor means and branched off into said multiplicity of controllers means; (h) all other lines of said multiplicity of I/O address lines connected to said decoder means and branched off into said multiplicity of controllers means; and (i) said several control lines connected to said decoder means and branched off into said multiplicity of controller means; (j) whereby when said gate control circuitry and apparatus is connected between said computer and a multiplicity of hard disk drives respectively, the gate control circuitry and apparatus can enable the computer to simultaneously and selectively control the multiplicity of hard disk drives for operations such as preparation, diagnosis or data storage.

Defined more broadly, the present invention is a gate control circuitry and apparatus for a single computer having a multiplicity of data lines, a multiplicity of I/O address lines including an address line and a primary and secondary addresses switching line for a certain kind of computer component device, and several control lines output from the CPU, the gate control circuitry and apparatus comprising: (a) a multiplicity of latch means connected to said multiplicity of data lines respectively; (b) a multiplicity of gate means connected to said multiplicity latch means respectively; (c) a multiplicity of controller means of said kind of computer component device connected to said multiplicity of gate means respectively; (d) a decoder means connected to said multiplicity of latch means; (e) said address line connected to said decoder means and branched off into said multiplicity of gate means; (f) an invertor means; (g) said primary and secondary addresses switching line connected to invertor means and branched off into said multiplicity of controllers means; (h) all other lines of said multiplicity of I/O address lines connected to said decoder means and branched off into said multiplicity of controllers means; and (i) said several control lines connected to said decoder means and branched off into said & multiplicity of controller means; (j) whereby when said circuit connection means is connected between a computer and respectively, the gate control circuitry and apparatus can enable the computer to simultaneously and selectively control the multiplicity of said kind of computer component device for operations such as diagnosis.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A gate control circuitry and apparatus for using a single computer to control a multiplicity of hard disk drives simultaneously and selectively, the single computer having a multiplicity of control lines, a multiplicity of data lines, and a multiplicity of input/output address lines including a hard disk drive address line and a primary and secondary hard disk drive addresses switching line, the gate control circuitry and apparatus comprising:
   a. a latch means connected to said single computer by said multiplicity of data lines;
   b. a multiplicity of gate means each connected to said latch means and corresponding to a respective one of said multiplicity of data lines;
   c. a multiplicity of hard disk dive controller means each connected to a respective one of said multiplicity of gate means;
   d. each of said multiplicity of control lines and said multiplicity of input/output address lines, except said hard disk drive address line and said primary and secondary hard disk drive addresses switching line, connected to a decoder means and then branched off into each of said multiplicity of hard disk drive controller means;
   e. said hard disk drive address line connected to said decoder means and then branched off into each of said multiplicity of gate means;
   f. said primary and secondary hard disk drive addresses switching line connected to an invertor means and then branched off into each of said multiplicity of hard disk drive controller means; and
   g. said latch means also connected to said decoder means;
   h. whereby said decoder means can decode a latch control signal received from said single computer and send a decoded latch control signal to said latch means, which in turn will control said multiplicity of gate means to be opened or closed individually for said hard disk drive address line, so that said multiplicity of hard disk drive controller means can be activated or deactivated individually, to thereby enable said single computer to control said multiplicity of hard disk drives simultaneously and selectively for operations such as preparation, diagnosis or data storage.

2. A gate control circuitry and apparatus in accordance with claim 1 further comprising:

a. an additional latch means connected to said single computer by said multiplicity of data lines;

b. a system gate means connected to said additional latch means;

c. a system hard disk drive controller means connected to said system gate means;

d. each of said multiplicity of control lines and said multiplicity of input/output address lines also connected to said system hard disk drive controller means but not connected to said hard disk drive address line;

e. said hard disk drive address line also connected to said system gate means;

f. a three-way electronic switch means connected to said primary and secondary hard disk drive addresses switching line and said invertor means, and controlled by said additional latch means such that the three-way electronic switch means can be switched to let said primary and secondary hard disk drive addresses switching line go through or bypass said invertor means; and g. said additional latch means also connected to said decoder means;

h. whereby said decoder means can decode an additional latch control signal received from said single computer and send an additional decoded latch control signal to said additional latch means, which in turn will switch said three-way electronic switch means to let said primary and secondary hard disk drive addresses switching line bypass said invertor means and close said system gate means for said hard disk drive address line to disable said system hard disk drive controller means, to thereby enable said single computer to control said multiplicity of hard disk drives simultaneously and selectively as primary hard disk drives for operations such as preparation, diagnosis or data storage.

3. A gate control circuitry and apparatus for using a single computer to control a multiplicity of hard disk drives simultaneously and selectively, the single computer having a multiplicity of control lines, sixteen data lines, and twenty input/output address lines including a hard disk drive address line and a primary and secondary hard disk drive addresses switching line, the gate control circuitry and apparatus comprising:

a. a latch means connected to said single computer by said sixteen data lines;

b. a multiplicity of gate means each connected to said latch means and corresponding to a respective one of said sixteen data lines;

c. a multiplicity of hard disk drive controller means each connected to a respective one of said multiplicity of gate means;

d. each of said multiplicity of control lines and said twenty input/output address lines, except said hard disk drive address line and said primary and secondary hard disk drive addresses switching line, connected to a decoder means and then branched off into each of said multiplicity of hard disk drive controller means;

e. said hard disk drive address line connected to said decoder means and then branched off into each of said multiplicity of gate means;

f. said primary and secondary hard disk drive addresses switching line connected to an invertor means and then branched off into each of said multiplicity of hard disk drive controller means; and g. said latch means also connected to said decoder means;

h. whereby said decoder means can decode a latch control signal received from said single computer and send a decoded latch control signal to said latch means, which in turn will control said multiplicity of gate means to be opened or closed individually for said hard disk drive address line, so that said multiplicity of hard disk drive controller means can be activated or deactivated individually, to thereby enable said single computer to control said multiplicity of hard disk drives simultaneously and selectively for operations such as preparation, diagnosis or data storage.

4. A gate control circuitry and apparatus in accordance with claim 3 further comprising:

a. an additional latch means connected to said single computer by said sixteen data lines;

b. a system gate means connected to said additional latch means;

c. a system hard disk drive controller means connected to said system gate means;

d. each of said multiplicity of control lines and said twenty input/output address lines, except said hard disk drive address line, also connected to said system hard disk drive controller means;

e. said hard disk drive address line also connected to said system gate means;

f. a three-way electronic switch means connected to said primary and secondary hard disk drive addresses switching lines and said invertor means, and controlled by said additional latch means such that the three-way electronic switch means can be switched to let said primary and secondary hard disk drive addresses switching line go through or bypass said invertor means; and g. said additional latch means also connected to said decoder means;

h. whereby said decoder means can decode an additional latch control signal received from said single computer and send an additional decoded latch control signal to said additional latch means, which in turn will switch said three-way electronic switch means to let said primary and secondary hard disk drive addresses switching line bypass said invertor means, and close said system gate means for said hard disk drive address line to disable said system hard disk drive controller means, to thereby enable said single computer to control said multiplicity of hard disk drives simultaneously and selectively as primary hard disk drives for operations such as preparation, diagnosis or data storage.

5. A gate control circuitry and apparatus for using a single computer to control a multiplicity of hard disk drives simultaneously and selectively, the single computer having a multiplicity of control lines, a multiplicity of data lines, and a multiplicity of input/output address lines including a hard disk drive address line and a primary and secondary hard disk drive addresses switching line, the gate control circuitry and apparatus comprising:

a. a multiplicity of latch means;

b. each of said multiplicity of data lines branched off into a respective one of said multiplicity of latch means;

c. a multiplicity of gate means each connected to said multiplicity of latch means and corresponding to a respective one of said multiplicity of data lines;

d. a multiplicity of hard disk drive controller means each connected to a respective one of said multiplicity of gate means;

e. each of said multiplicity of control lines and said multiplicity of input/output address lines, except said hard disk drive address lien and said primary and secondary hard disk drive address switching line, connected to a decoder means and then branched off into each of said multiplicity of hard disk drive controller means;

f. said hard disk drive address line connected to said decoder means and then branched off into each of said multiplicity of gate means;

g. said primary and secondary hard disk drive addresses switching line connected to an invertor means and then branched off into each of said multiplicity of hard disk drive controller means; and h. said multiplicity of latch means also connected to said decoder means;

i. whereby said decoder means can decode a latch control signal received from said single computer and send a decoded latch control signal to said multiplicity of latch means, which in turn will control said multiplicity of gate means to be opened or closed individually for said hard disk drive address line, so that said multiplicity of hard disk drive controller means can be activated or deactivated individually, to thereby enable said single computer to control said multiplicity of hard disk drives simultaneously and selectively for operations such as preparation, diagnosis or data storage.

6. A gate control circuitry and apparatus in accordance with claim 5 further comprising:

a. an additional latch means connected to said single computer by said multiplicity of data lines;

b. a system gate means connected to said additional latch means;

c. a system hard disk drive controller means connected to said system gate means;

d. each of said multiplicity of control lines and said multiplicity of input/output address lines, except said hard disk drive address line, also connected to said system hard disk drive controller means;

e. said hard disk drive address line also connected to said system gate means;

f. a three-way electronic switch means connected to said primary and secondary hard disk drive addresses switching line and said invertor means, and controlled by said additional latch means such that the three-way electronic switch means can be switched to let said primary and secondary hard disk drive addresses switching line to go through or bypass said invertor means; and g. said additional latch means also connected to said decoder means;

h. whereby said decoder means can decode an additional latch control signal received from said single computer and send an additional decoded latch control signal to said additional latch means, which in turn will switch said three-way electronic switch means to let said primary and secondary hard disk drive addresses switching line bypass said invertor means, and close said system gate means for said hard disk drive address line to disable said system hard disk drive controller means, to thereby enable said single computer to control said multiplicity of hard disk drives simultaneously and selectively as primary hard disk drives for operations such as preparation, diagnosis or data storage.

7. A gate control circuitry and apparatus for using a single computer to control a multiplicity of computer component devices simultaneously and selectively, the single computer having a multiplicity of control lines, a multiplicity of data lines, and a multiplicity of input-/output address lines including a computer component device address line and a primary and secondary computer component device address switching line, the gate control circuitry and apparatus comprising:

a. a multiplicity of latch means;

b. each of said multiplicity of data lines branched off into a respective one of said multiplicity of latch means;

c. a multiplicity of gate means each connected to said multiplicity of latch means and corresponding to a respective one of said multiplicity of data lines;

d. a multiplicity of computer component device controller means each connected to a respective one of said multiplicity of gate means;

e. each of said multiplicity of control lines and said multiplicity of input/output address lines, except said computer component device address line and said primary and secondary computer component device addresses switching line, connected to a decoder means and then branched off into each of said multiplicity of computer component device controller means;

f. said computer component device address line connected to said decoder means and then branched off into each of said multiplicity of gate means;

g. said primary and secondary computer component device address switching line connected to an invertor means an then branched off into each of said multiplicity of computer component device controller means; and h. said multiplicity of latch means also connected to said decoder means;

i. whereby said decoder means can decode a latch control signal received from said single computer and send a decoded latch control signal to said multiplicity of latch means, which in turn will control said multiplicity of gate means to be opened or closed individually for said computer component device address line, so that said multiplicity of computer component device controller means can be activated or deactivated individually, to thereby enable said single computer to control said multiplicity of computer component devices simultaneously and selectively for operations such as preparation, diagnosis or data storage.

8. A gate control circuitry and apparatus in accordance with claim 7 wherein said multiplicity of computer component devices are computer tape drives.

9. A gate control circuitry and apparatus in accordance with claim 7 wherein said multiplicity of computer component devices are computer floppy diskette drives.

10. A gate control circuitry and apparatus in accordance with claim 7 further comprising:

a. an additional latch means connected to said single computer by said multiplicity of data lines;

b. a system gate means connected to said additional latch means;

c. a system computer component device controller means connected to said system gate means;

d. each of said multiplicity of control lines and said multiplicity of input/output address lines, except said computer component device address line, also connected to said system computer component device controller means;

e. said computer component device address line also connected to said system gate means;

f. a three-way electronic switch means connected to said primary and secondary computer component device address switching line and said invertor means, and controlled by said additional latch means such that the three-way electronic switch means can be switched to let said primary and secondary computer component device addresses switching line to go through or bypass said invertor means; and g. said additional latch means also connected to said decoder means;

h. whereby said decoder means can decode an additional latch control signal received from said single computer and send an additional decoded latch control signal to said additional latch means, which in turn will switch said three-way electronic switch means to let said primary and secondary computer component device addresses switching line bypass said invertor means, and close said system gate means for said computer component device address line to disable said system computer component device controller means, to thereby enable said single computer to control said multiplicity of computer component devices simultaneously and selectively as primary computer component devices for operations such as preparation, diagnosis or data storage.

11. A gate control circuitry and apparatus in accordance with claim 10 wherein said multiplicity of computer component devices are computer tape drives.

12. A gate control circuitry and apparatus in accordance with claim 10 wherein said multiplicity of computer component devices are computer floppy diskette drives.

* * * * *